(12) United States Patent
Overbeck et al.

(10) Patent No.: US 7,808,639 B2
(45) Date of Patent: Oct. 5, 2010

(54) COLOR MEASUREMENT INSTRUMENT

(75) Inventors: James L. Overbeck, Ada, MI (US); Weston L. Harness, Coopersville, MI (US)

(73) Assignee: X-Rite, Inc., Grand Rapids, MI (US)

( * ) Notice: Subject to any disclaimer, the term of this patent is extended or adjusted under 35 U.S.C. 154(b) by 565 days.

(21) Appl. No.: 11/857,056

(22) Filed: Sep. 18, 2007

(65) Prior Publication Data

US 2008/0074667 A1 Mar. 27, 2008

Related U.S. Application Data

(60) Provisional application No. 60/846,190, filed on Sep. 21, 2006.

(51) Int. Cl.
*G01J 3/46* (2006.01)
(52) U.S. Cl. ........................... 356/402; 356/420
(58) Field of Classification Search ................ 356/402, 356/405–408, 416, 419, 420; 433/26–29, 433/203.1, 215; 264/1.24, 1.26
See application file for complete search history.

(56) References Cited

U.S. PATENT DOCUMENTS 5,690,486 A 11/1997 Zigelbaum
2007/0035740 A1 2/2007 Nisper et al.

FOREIGN PATENT DOCUMENTS

DE 19534517 3/1997
WO 00/12020 3/2000

OTHER PUBLICATIONS

Harness et al., U.S. Appl. No. 11/522,585, filed Sep. 18, 2006.
PCT International Search Report dated Mar. 3, 2008.

*Primary Examiner*—Gregory J Toatley, Jr.
*Assistant Examiner*—Tri T Ton
(74) *Attorney, Agent, or Firm*—McCarther & English, LLP (57) ABSTRACT

A color measurement instrument and color measurement method for measuring a color of a surface are provided. The instrument includes a plurality of independently switchable light sources characterized by differing spectral ranges, and a plurality of light guides configured to receive light from the light sources and to direct the received light to a light emitting portion of the instrument for illuminating the surface. The instrument further includes a first light detector configured to receive a portion of the light reflected from the surface. The first light detector is a wideband light detector.

27 Claims, 9 Drawing Sheets

COLOR MEASUREMENT INSTRUMENT

CROSS-REFERENCE TO RELATED APPLICATION

This application claims priority from the United States Provisional patent application entitled "Color Measurement Instrument" having Ser. No. 60/846,190 and filed on Sep. 21, 2006, the disclosure of which is incorporated herein by reference.

TECHNICAL FIELD

The present disclosure relates generally to color measurement instruments and, more particularly, to color measurement instruments for use in the field of dentistry.

BACKGROUND

The determination of color or shade of an object is a process that is frequently performed in the field of dentistry. For example, to perform a dental restoration of a damaged tooth, a dentist may visually compare the color of the tooth to be replaced with an assortment of shade tabs. These shade tabs are physical tabs representing the color of commercially available restorative materials, such as ceramics. The tabs include the exact specification of materials needed to produce a restorative tooth with the shade of the original tooth as determined by the dentist's visual comparison. Once the dentist finds a shade tab that matches the color of the tooth, or remaining adjacent teeth in some cases, he/she is in a position to manufacture the required restoration. This process, however, is very time consuming, subjective, and frequently results in poorly shaded restorations.

To address these and other problems associated with visual color comparisons, instruments for measuring tooth color have been developed and are commercially available. Such instruments typically utilize a reflectance-based measurement arrangement wherein a light source illuminates the tooth and one or more light sensors detect a portion of the light reflected from the tooth surface. The light sensor output is then processed to determine spectral characteristics of the reflected light and, thus, the tooth color.

Conventional color measurement instruments for use in dental applications are not without their drawbacks, however. First, the optical design of such instruments typically requires the instrument to be precisely presented at a pre-determined angle with respect to the tooth surface in order to ensure accurate measurements. Because these instruments are usually configured for hand-held use, measurement accuracy is necessarily limited by the user's ability to precisely maintain the proper presentation angle. Second, in cases where the instruments are configured for insertion into a patient's mouth, it may be necessary to clean and sterilize at least a portion of the instrument between uses. For many conventional instrument configurations, this process is time-consuming and otherwise inconvenient.

To minimize cleaning/sterilization problems, some instrument designs incorporate a disposable "bag" for sealing that portion of the instrument inserted into the mouth. However, this arrangement invariably introduces measurement error due to the absorptive, scattering and reflective effects of the bag upon light transmitted to and reflected from the tooth surface. Other instrument designs utilize a disposable light guide for contacting the tooth and injecting light therein. This illumination arrangement, however, does not provide a standard measurement geometry representative of normal viewing conditions. As a result, color measurements may not correlate well with visual assessments. Third, the ability of conventional instruments to block ambient light present during normal room illumination is limited, further reducing measurement accuracy.

Thus, a need remains for apparatus, systems and methods for color measurement in the dental field that overcome the limitations and disadvantages of existing color measurement modalities.

SUMMARY

In one aspect, the present disclosure is directed to a color measurement instrument for measuring a color of a surface. Exemplary embodiments of the disclosed instrument include a plurality of independently switchable light sources characterized by differing spectral ranges, and a plurality of light guides configured to receive light from the light sources and to direct the received light to a light emitting portion of the instrument for illuminating the surface. Exemplary instruments further include a first light detector configured to receive a portion of the light reflected from the surface. The first light detector is typically a wideband light detector.

In another aspect, the present disclosure is directed to a color measurement instrument for measuring color of a tooth. Exemplary embodiments of the disclosed instrument include a plurality of independently switchable light sources characterized by differing spectral ranges, and a plurality of light guides configured to receive light from the light sources and to direct the received light to a light-emitting portion of the instrument for illuminating a surface of the tooth. The disclosed instrument further includes a first light detector configured to receive a portion of the light that is reflected from the surface. The first light detector is generally a wideband light detector.

In another aspect, the present disclosure is directed to a method for measuring a color of a surface. The disclosed method typically includes sequentially generating light characterized by differing spectral ranges in a plurality of light sources; guiding the light onto the surface via a plurality of light guides; monitoring light reflected from the surface by a first light detector; and processing signals from the first light detector to provide color information for the surface. The first light detector is generally a wideband light detector.

Additional features, functions and advantages of the disclosed color measurement instruments and color measurement methods will be apparent from the description of exemplary embodiment(s) which follows, particularly when read in conjunction with the accompanying figures.

BRIEF DESCRIPTION OF THE FIGURES

To assist those of ordinary skill in the art in making and using the disclosed color measurement instruments, reference is made to the accompanying figures, wherein.

DESCRIPTION

The present disclosure provides advantageous color measurement instruments having particular utility in measuring the color of a surface, e.g., a tooth. Thus, the color measurement instruments and color measurement methods disclosed herein are particularly beneficial in the field of dentistry. The disclosed instruments and methods overcome limitations and disadvantages associated with prior art instruments/methods, thereby facilitating efficient, reliable and accurate color measurement applications.

Figure 1:
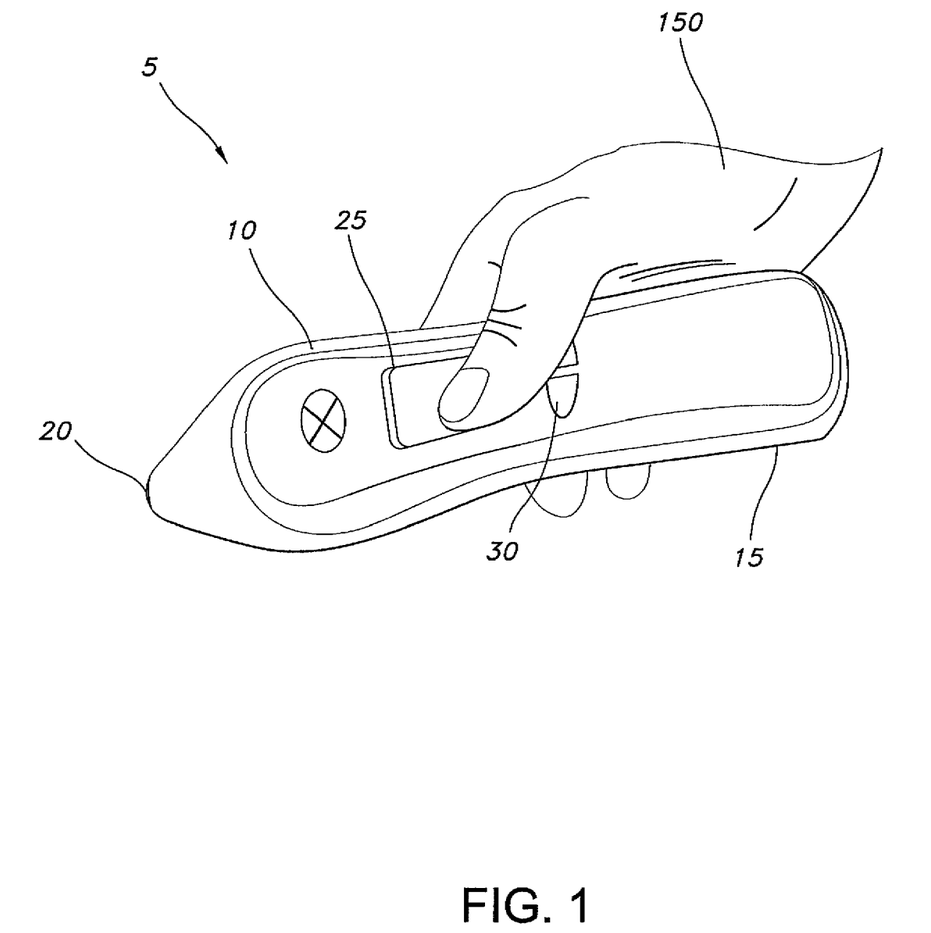
FIG. 1 illustrates a perspective view of an exemplary instrument according to various embodiments of the present disclosure.

FIG. 1 illustrates an exemplary color measurement instrument 5 for measuring the color of a surface, such as a surface of a tooth, according to various embodiments of the present disclosure. As shown, the instrument 5 is configured to be grasped in the hand 150 during use and includes a housing 10 having a proximal handle portion 15 and a distal tip portion 20. The instrument 5 is depicted without the optical tip 63 described below in connection with FIGS. 3H and 3I. It will be appreciated that the terms "proximal" and "distal" are used herein with reference to a user gripping the handle portion 15. Thus, the tip portion 20 is distal with respect to the more proximal handle portion 15. It will be further appreciated that, for convenience and clarity, spatial terms such as "above" and "below" may be used herein with respect to the drawings. However, because the instrument 5 may be used in many orientations and positions, these terms are not intended to be limiting and absolute.

The handle portion 15 may include a user interface that features a display 25 and data input/control means 30 (positioned adjacent the user's thumb in FIG. 1). In certain embodiments, the display 25 may provide a graphical user interface (GUI) that, when navigated by the user, presents color measurement data and/or data relating to configuration(s) of the instrument 5. The display 25 may be, for example, a color LCD display or other suitable display device. The user input/control means 30 may comprise one or more switches, such as membrane switches, for enabling navigation through the GUI, initiating color measurements, and entering configuration data. Although not shown in FIG. 1, it will be appreciated that the data input/control means 30 may alternatively or additionally include other types of data input devices/functionalities, such as, for example, scroll wheel or track ball data input devices. The display 25 and data input/control means 30 may be in communication with a processor board assembly 40 (FIG. 2).

Figure 2:
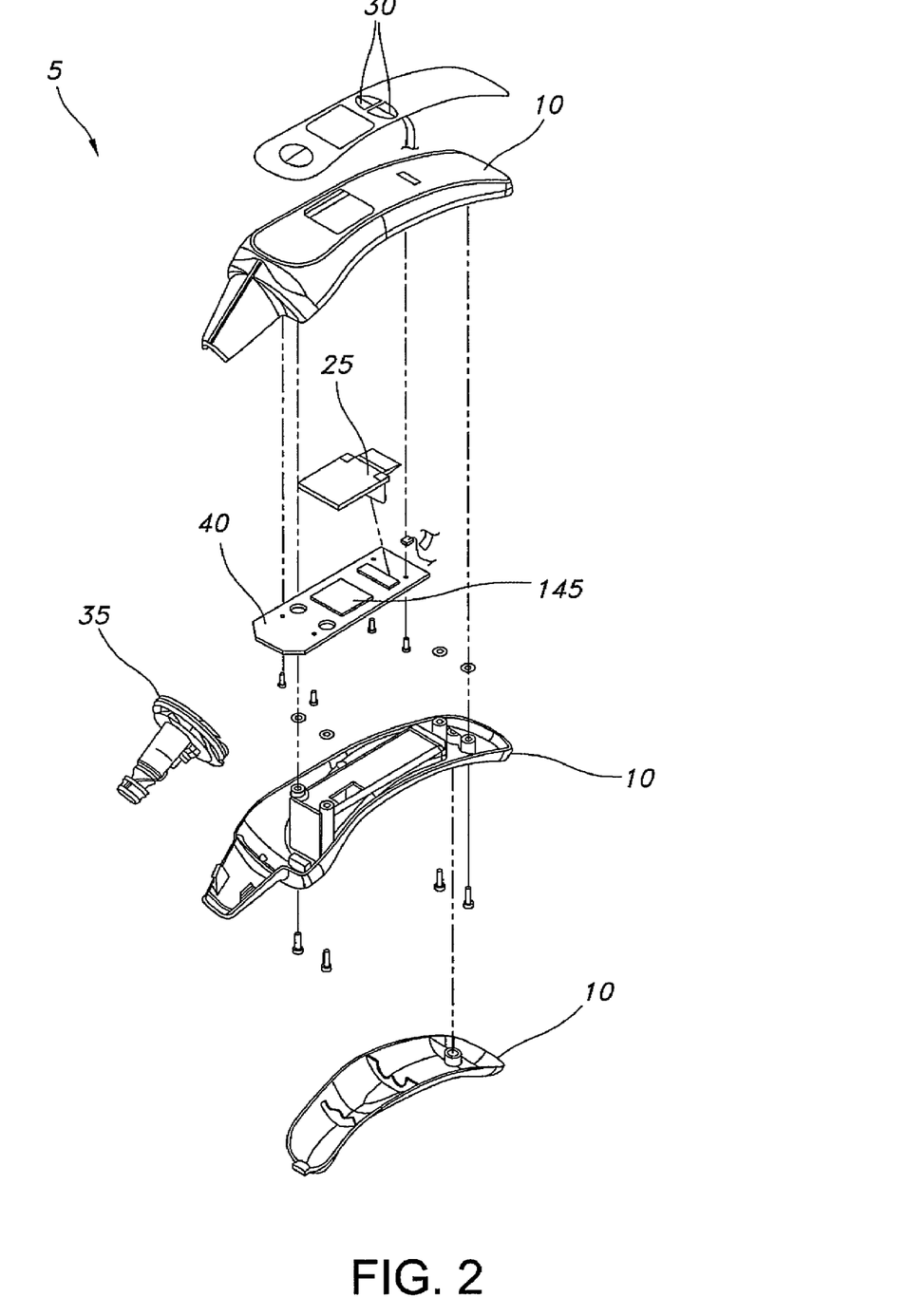
FIG. 2 illustrates an exploded view of the exemplary instrument of FIG. 1 according to various embodiments of the present disclosure.

FIG. 2 illustrates an exploded view of the instrument 5 of FIG. 1 according to various embodiments of the present disclosure. In addition to the housing 10, the instrument 5 may include an optical assembly 35 and a processor board assembly 40.

Figure 3A:
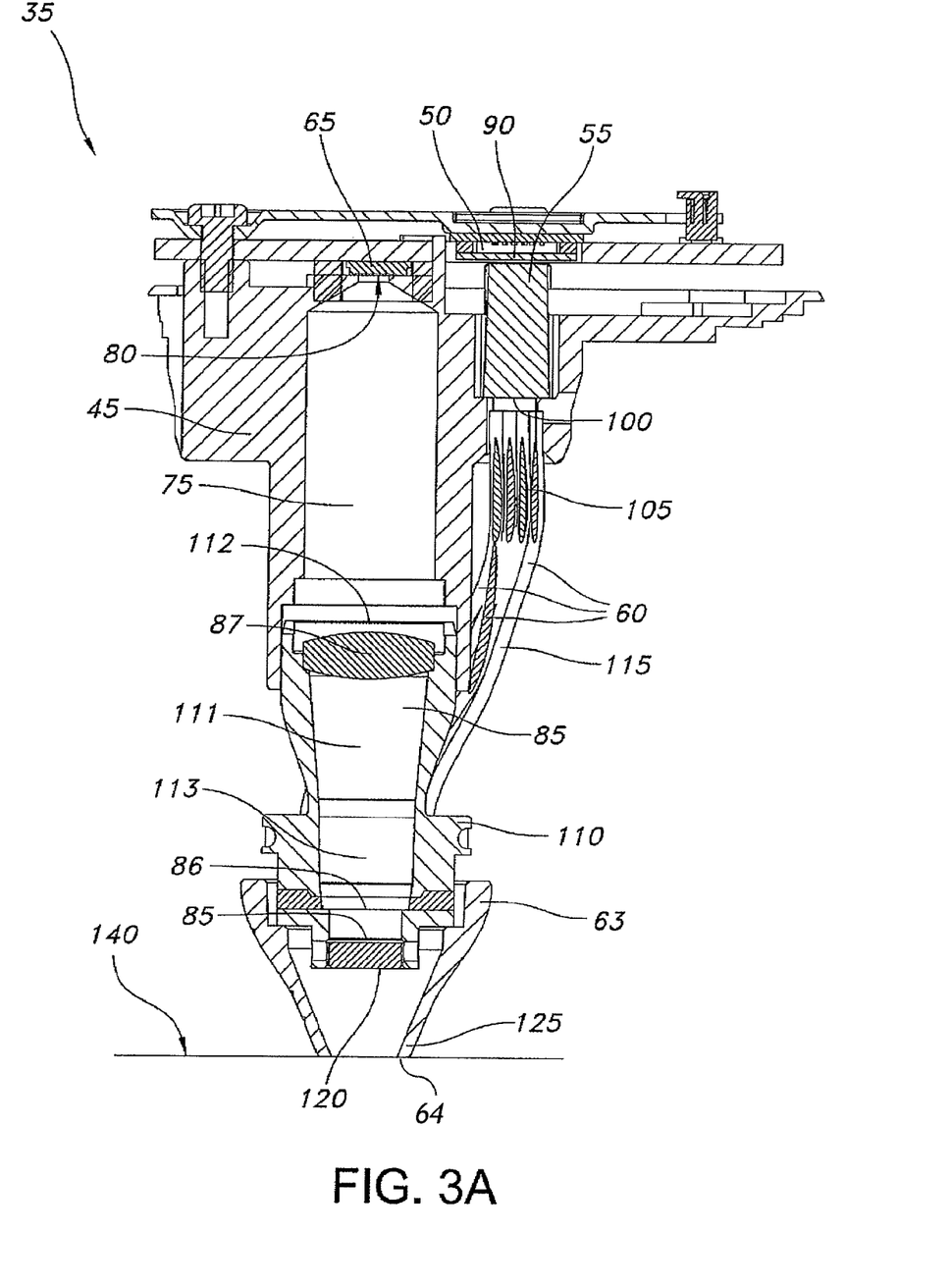
FIGS. 3A and 3B illustrate cutaway side views of the optical assembly of the exemplary instrument of FIG. 2 according to various embodiments of the present disclosure.
Figure 3B:
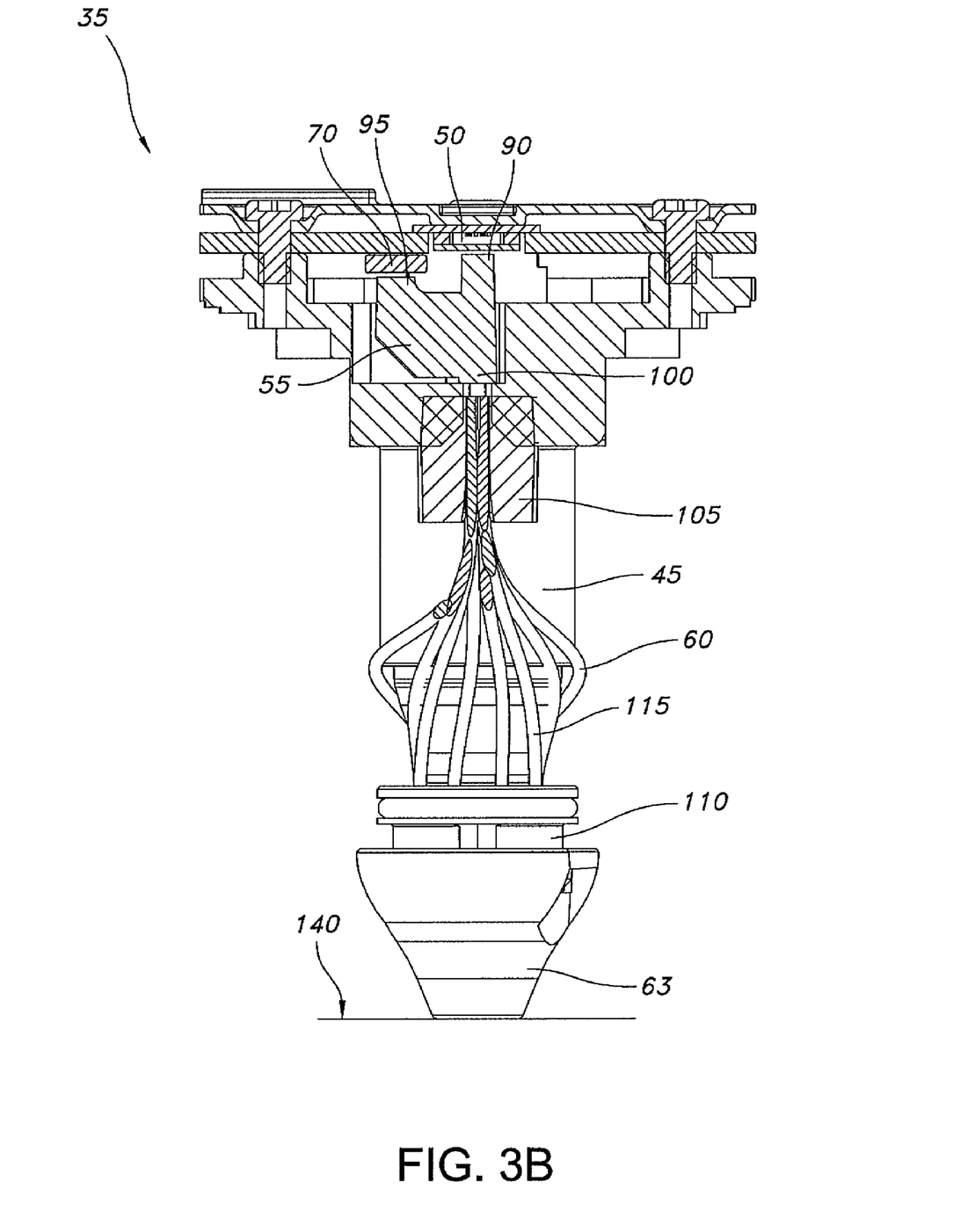
Figure 3C:
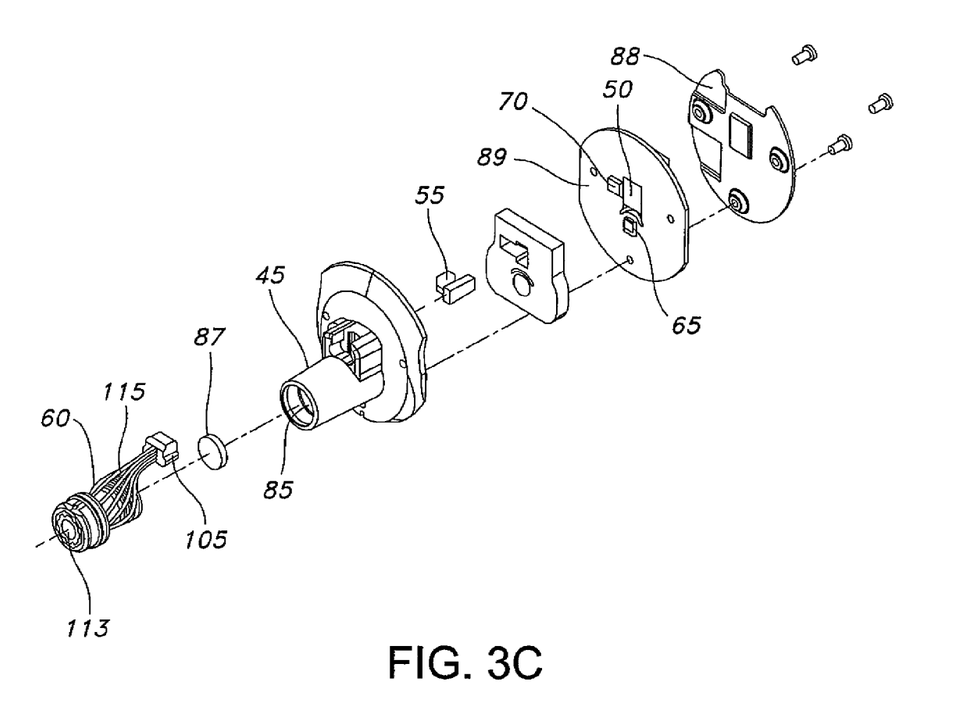
FIG. 3C illustrates an exploded view of portions of the optical assembly of FIG. 2 according to various embodiments of the present disclosure.

FIGS. 3A and 3B illustrate cutaway side views of the optical assembly 35 of FIG. 2 according to various embodiments of the present disclosure. FIG. 3C illustrates an exploded view of portions of the optical assembly 35. As shown, the optical assembly 35 includes an optical body 45 (FIGS. 3F and 3G), an illumination source 50 (FIG. 4) and a light mixer 55 (FIG. 3D) mounted adjacent a proximal end of the optical body 45, an optical overmold assembly 60 (FIG. 3E) attached adjacent the proximal and distal ends of the optical body 45 and extending therebetween, an optical tip 63 (FIGS. 3H and 3I) removably attached to a distal end of the optical overmold assembly 60, and a first light detector 65 (the "primary detector") and second light detector 70 (the "monitor detector") mounted adjacent the proximal end of the optical body 45.

Figure 3D:
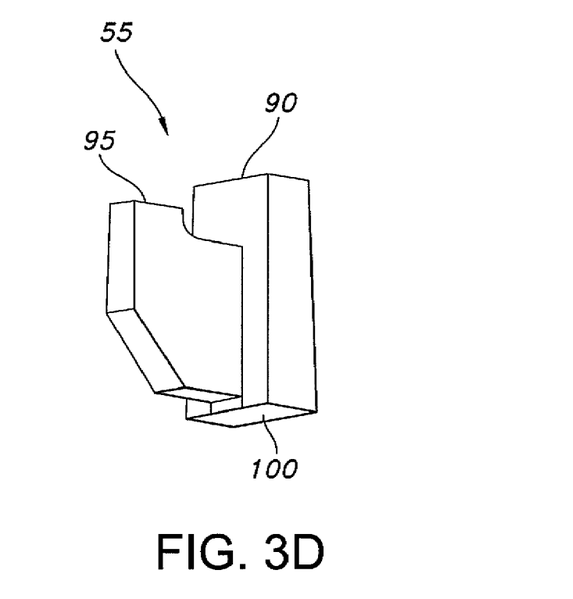
FIG. 3D illustrates a perspective view of an exemplary light mixer of the disclosed optical assembly according to various embodiments of the present disclosure.
Figure 3E:
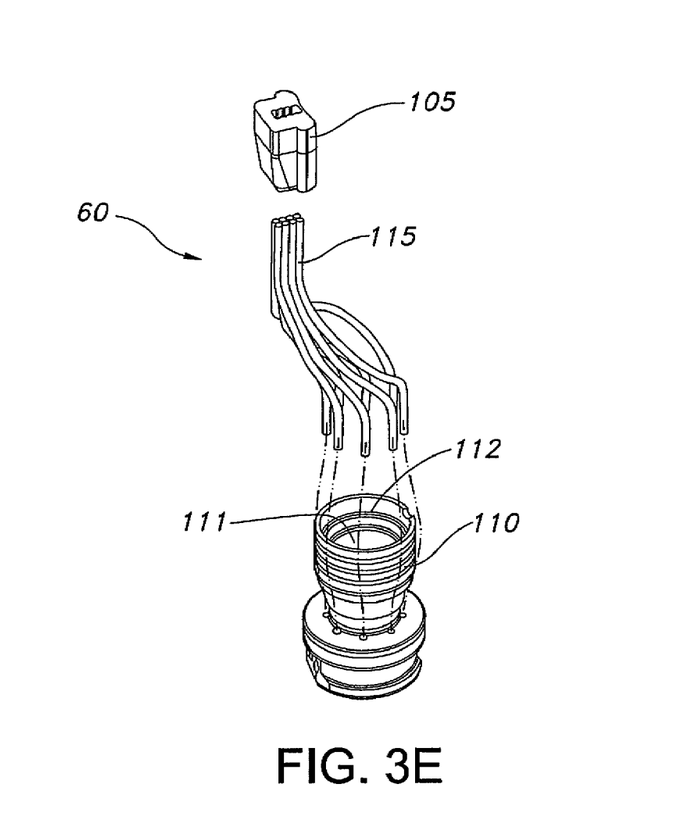
FIG. 3E illustrates an exploded view of an exemplary optic overmold assembly of the disclosed optical assembly of FIG. 3C according to various embodiments of the present disclosure.
Figure 3F:
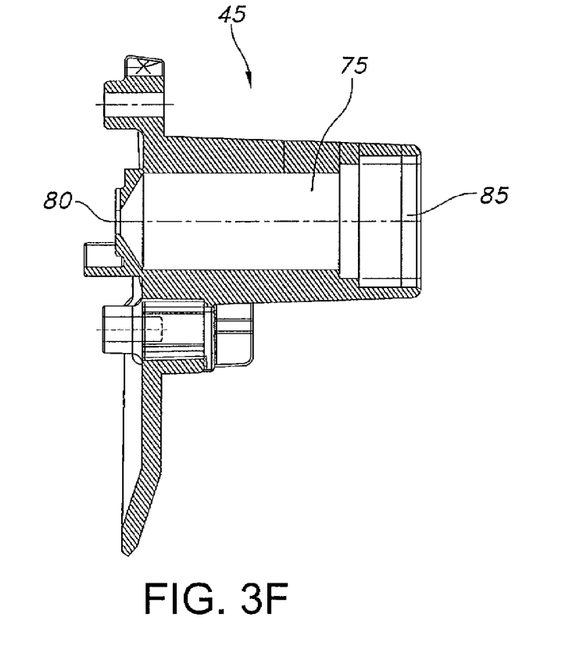
FIGS. 3F and 3G illustrate cross-sectional and perspective views, respectively, of the disclosed optical assembly of FIG. 3C according to various embodiments of the present disclosure.
Figure 3G:
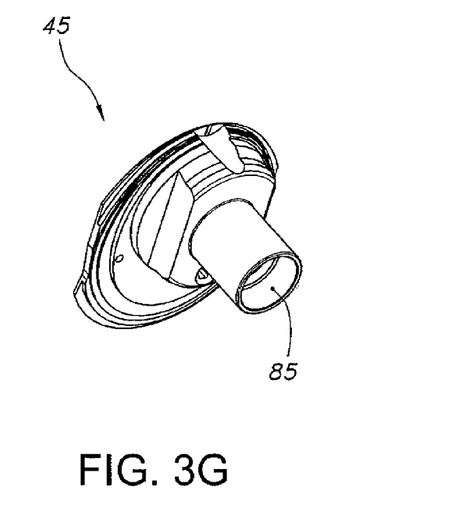

FIGS. 3F and 3G illustrate cross-sectional and perspective views, respectively, of the optical body 45 according to various embodiments of the present disclosure. The optical body 45 may be machined or cast from a suitable material, such as, for example, aluminum, and defines an axial cavity 75 having a proximal aperture 80 and a distal aperture 85. In certain embodiments, surfaces of the optical body 45 may be anodized with a matte black finish, for example, to minimize reflectivity. The optical body 45 may further include a lens 87 (FIG. 3A) concentrically disposed within the axial cavity 75 for focusing reflected light onto the primary detector 65, as discussed below.

Figure 4:
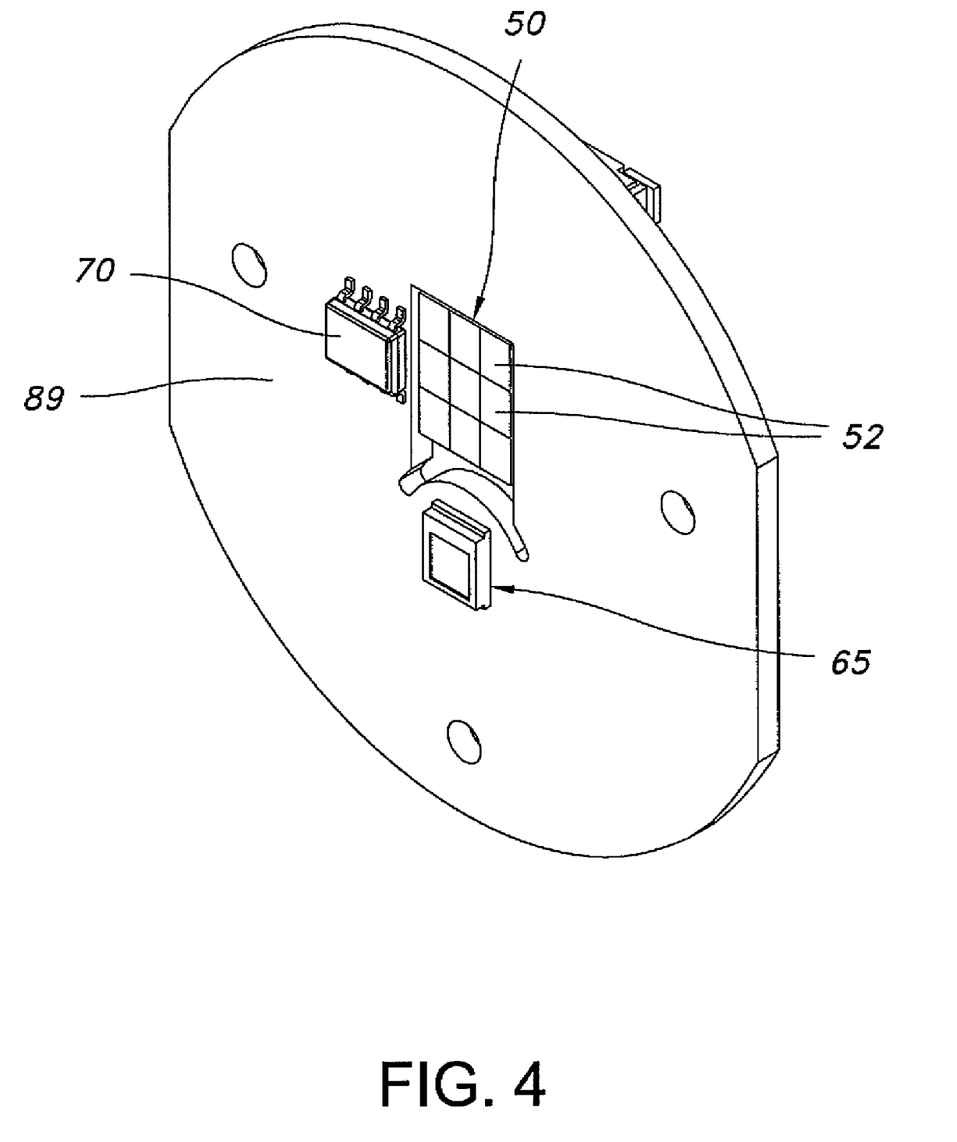
FIG. 4 illustrates a detail of an exemplary printed circuit board of according to various embodiments of the present disclosure.

As best shown in FIG. 3C and in FIG. 4, the illumination source 50 may be mounted on a printed circuit board 89 adjacent the distal end of the optical body 45 and include a plurality of independently switchable light sources 52, which may be light-emitting semiconductors. For example, the light sources 52 may, in certain embodiments, be differently-colored LEDs (best seen in FIG. 4). According to various embodiments, for example, the LEDs may have nominal wavelengths of 405 nm, 430 nm, 470 nm, 505 nm, 527 nm, 570 nm, 590 nm, 630 nm, 660 nm, etc. A heat sink 88 (best seen in FIG. 3C) may be provided over the illumination source 50. The light sources 52 of the illumination source 50 may be controlled by a processing unit 145 (FIG. 2) of the processor board assembly 40 during color measurements such that the light sources 52 are illuminated in a sequential fashion.

FIG. 3D illustrates a perspective view of the light mixer 55 of the optical assembly 35, according to certain embodiments. The light mixer 55 randomizes the light output of the illumination source 50 across the light guides 115 of the optic overmold assembly 60 (FIG. 3E) and may be fabricated from acrylic, glass or other suitable transparent or translucent material. As best seen in FIG. 3B, first and second surfaces 90, 95 of the light mixer 55 may be directly attached and optically coupled to the illumination source 50 and the monitor detector 70, respectively. In certain embodiments, optical gel may be applied to the surfaces 90, 95 in order to enhance optical coupling. A third surface 100 of the light mixer 55 may be directly attached and optically coupled to a proximal portion of the optic overmold assembly 60, as discussed below.

According to various embodiments and as best seen in FIG. 3E, the optic overmold assembly 60 includes a holder 105, a lower optic body 110, and a plurality of light guides 115, each light guide 115 having proximal and distal ends that terminate in the holder 105 and the lower optic body 110, respectively. According to various embodiments and as shown, the exemplary optic overmold assembly 60 includes eight light guides 115, although it will be appreciated that more or fewer light guides 115 may be employed based on desired functionality. The light guides 115 may be, for example, optical fibers formed from a suitable material, such as acrylic, transparent organics, glass, and the like. As shown in FIG. 3A, the holder 105 may be retained by a portion of the optical body 45 such that the proximal ends of the light guides 115 are positioned adjacent the third surface 100 of the light mixer 55. The proximal ends of the light guides 115 may be directly attached and optically coupled to the third surface 100 of the light mixer 55 using an optical epoxy. The distal ends of the light guides 115 may be uniformly terminated about the circumference of the lower optic body 110.

According to various embodiments, the light guides 115 may be terminated in the lower optic body 110 in accordance with one or more of the methods described in the U.S. patent application Ser. No. 11/522,585 entitled FIBER OPTIC OVERMOLD METHOD AND PRODUCT to Harness et al., filed on Sep. 18, 2006, the disclosure of which is incorporated herein by reference.

As further shown in FIG. 3A, the lower optic body 110 may define an axial cavity 111 having a proximal aperture 112 and a distal aperture 113. The proximal end of the lower optic body 110 may be received into the distal aperture 85 of the optical body 45 such that the apertures 80, 85, 112, 113 are aligned to define a common optical axis. The lower optical body 110 may include an optically transparent window 86 disposed over its distal aperture 113 for preventing contaminant ingress therethrough.

Figure 3H:
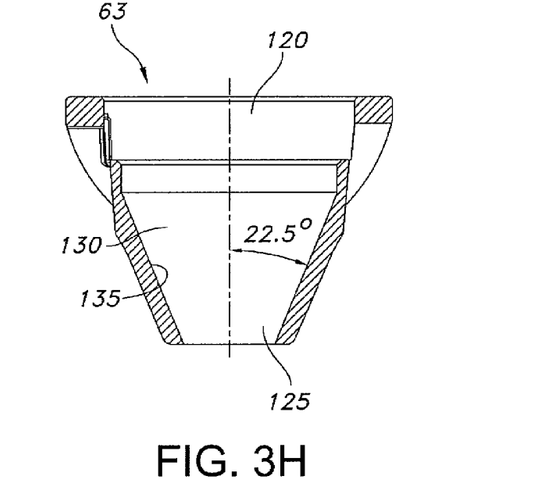
FIGS. 3H and 3I illustrate cross-sectional and perspective views, respectively, of the exemplary optical tip of FIGS. 3A and 3B according to various embodiments of the present disclosure.
Figure 3I:
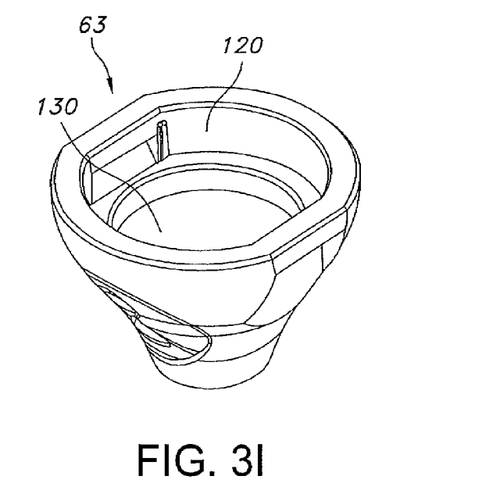

As best seen in FIGS. 3H and 3I, the optical tip 63 may include a proximal aperture 120 and a distal aperture 125 joined by an inner-cavity 130 having a distally-tapered frustoconical geometry. The optical tip 63 may be substantially axisymmetric with respect to an optical axis extending through the apertures 120, 125. The optical tip 63 is configured for removably engaging a distal portion of the lower optic body 110. According to various embodiments, for example, a portion of the inner-cavity 130 adjacent the proximal aperture 120 may be sized for receiving the distal portion of the lower optic body 110. The engaging portions of the optical tip 63 and the lower optic body 110 may include alignment features (e.g., contoured edges) for ensuring proper rotational and longitudinal alignment. The optical tip 63 and the lower optic body 110 may further include any suitable engagement mechanisms that mechanically cooperate to releasably maintain their engagement.

When engaged by the lower optic body 110, the optical tip 63 is oriented such that apertures 80, 85 of the optical body 45, apertures 112, 113 of the lower optic body 110, and apertures 120, 125 of the optical tip 63 are aligned substantially along a common optical axis. A portion of the inner-cavity 130 may be enclosed by a reflective surface 135 oriented at approximately 22.5 degrees with respect to the common longitudinal optical axis of apertures 80, 85, 112, 113, 120, 125. The reflective surface 135 may be, for example, a reflective aluminum coating. In certain embodiments, at least a portion of the reflective surface 135 may be curved.

According to various embodiments, the optical tip 63 may be configured such that it is disposable. In this way, potential problems associated with cleaning and disinfecting the optical tip 63 subsequent to instrument use are avoided. In other embodiments, the optical tip 63 may be reusable and fabricated from a material compatible with conventional medical disinfectants and sanitizers. Alternatively or additionally, the optical tip 63 material may be compatible with standard sterilization techniques, such as steam sterilization by autoclave and/or sterilization by ethylene oxide gas treatment. In this way, the optical tip 63 may be cleaned and disinfected when disengaged from the lower optic body 110, and then reused.

As best seen in FIGS. 3A and 3B, the primary detector 65 may be mounted on or with respect to the printed circuit board 89 and positioned above the proximal aperture 80 of the optical body 45. According to various embodiments, the primary detector 65 may be a wideband light detector and include a single photodiode (not shown) and an appropriate transimpedence amplifier (not shown). The primary detector 65 may provide an output voltage signal proportional to an intensity of a particular wavelength of light received via the proximal aperture 80. The voltage signal may be communicated to the processing unit 145 on the processor board assembly 40 for subsequent processing as described below.

As best seen in FIG. 3B and FIG. 4, and as described above, the monitor detector 70 may be mounted on the printed circuit board 89 and directly attached and optically coupled to the second surface 95 of the light mixer 55. According to various embodiments, the monitor detector 70 includes a filtered light-to-frequency (LTF) photodiode sensor package that defines a multi-channeled detector having RGB and clear filter responses. In one embodiment, for example, the monitor detector 70 may include three LTF sensors for determining the respective intensities of red, green, and blue wavelengths present in the received light. The monitor detector 70 may further include an LTF sensor having a clear filter. According to various embodiments, the monitor detector 70 may be a TCS230 LTF detector available from TEXAS ADVANCED OPTOELECTRONIC SOLUTIONS (TAOS). It will be appreciated that the monitor detector 70 may alternatively include a filtered light-to-voltage (LTV) sensor package. The voltage signals output by the sensors of the monitor detector 70 may be communicated to the processor board assembly 40 for subsequent processing as described below.

With reference to FIG. 3A, the LEDs of the independently switchable light sources 52 of the illumination source 50 are sequentially energized during color measurement such that the light output at any moment is composed of a wavelength corresponding to a single LED color. As described above, the light mixer 55 randomizes the light output of the illumination source 50 across the proximal ends of the light guides 115. A first portion of the light mixer 55 output is introduced into the optical tip 63 via the light guides 115. As best seen in FIG. 3B, a second portion of the light mixer 55 output is transmitted directly to the monitor detector 70. Referring again to FIG. 3A, light emitted from the distal ends of the light guides 115 is introduced through the proximal aperture 120 of the optical tip 63 and is incident upon the reflective surface 135 of the inner-cavity 130. The incident light is redirected from the reflective surface 135 through the distal aperture 125 of the optical tip 63 and onto a tooth surface 140 to be measured. An orientation reference is provided by rim 64 that substantially lies in a plane, and which may be placed against the surface to be observed, thus enabling the instrument 5 to be placed in a preferred orientation relative to the surface. In this orientation, the optical axis 142 of apertures 80, 85, 112, 113, 120, 125 is positioned substantially normal to the tooth surface 140, and light exiting the distal aperture 125 of the optical tip 63 is obliquely presented at an angle of about 45 degrees with respect to the tooth surface 140 by virtue of the angular orientation of the reflective surface 135, thus providing a standard measurement geometry.

Furthermore, the illumination pattern provided by the optical tip 63 resulting from the circumferential introduction of light through the proximal aperture 120 reduces measurement errors that would otherwise result from a deviation of the optical axis from the tooth surface 140 normal. For example, for embodiments of the exemplary instrument 5 described herein, angular deviations of up to 10 degrees from the tooth surface 140 normal may be tolerated without experiencing measurement degradation. Moreover, because the optical tip 63 contacts the tooth surface 140 during color measurement, ambient light that would otherwise reduce measurement accuracy is advantageously prevented from entering through the distal aperture 125. A portion of the light reflected from the tooth surface 140 is received through the distal and proximal apertures 125, 120 of the optical tip 63 and directed to the primary detector 65 via the lower optic body 110, the lens 87, and the optical body 45.

The processor board assembly 40 may include a processing unit 145 or other suitable processing component or device. According to various embodiments, the processing unit 145 may include one or more analog-to-digital converters for digitizing voltage signals received from the primary and monitor detectors 65, 70. According to various embodiments, the processing unit 145 may apply one or more algorithms to the digitized voltage signals corresponding to the output of the primary detector 65 to determine the uncorrected color of the reflected light. The "uncorrected color" refers to a color measurement that is not compensated or otherwise adjusted for intensity and wavelength shift errors resulting from temperature variations in the LEDs of the illumination source 50.

In one embodiment, the wavelength shift errors are taken into account by first measuring the amount of temperature-induced wavelength shift associated with each LED based on the monitor detector 70 outputs, and then compensating the uncorrected color measurement accordingly. In another embodiment, the wavelength shift of only one LED is measured and used to estimate the wavelength shift of the remaining LEDs. For example, where the illumination source 50 includes a 590 nm LED, responses from red and green filtered LTV sensors of the monitor detector 70 may be used to determine the amount by which the output wavelength of the LED is shifted from 590 nm. This determination may be based upon characterizations of the red and green filtered LTV sensor outputs as a function of wavelength that have been previously stored within a memory associated with the processing unit 145. This and other techniques for compensating color measurements to account for LED temperature variations are more fully described in U.S. patent application Ser. No. 11/504,120 entitled CUSTOM CHARACTERIZED OPTICAL MEASUREMENT INSTRUMENT to Nisper et al., filed on Aug. 15, 2006, the disclosure of which is incorporated herein by reference. Based on the compensated, or corrected, color measurements, the processing unit 145 may select the closest color match for one or more shade guides stored therein. The color match(es) may then be stored by the processing unit 145 and/or output to the display 25 for viewing by the user.

Figure 5:
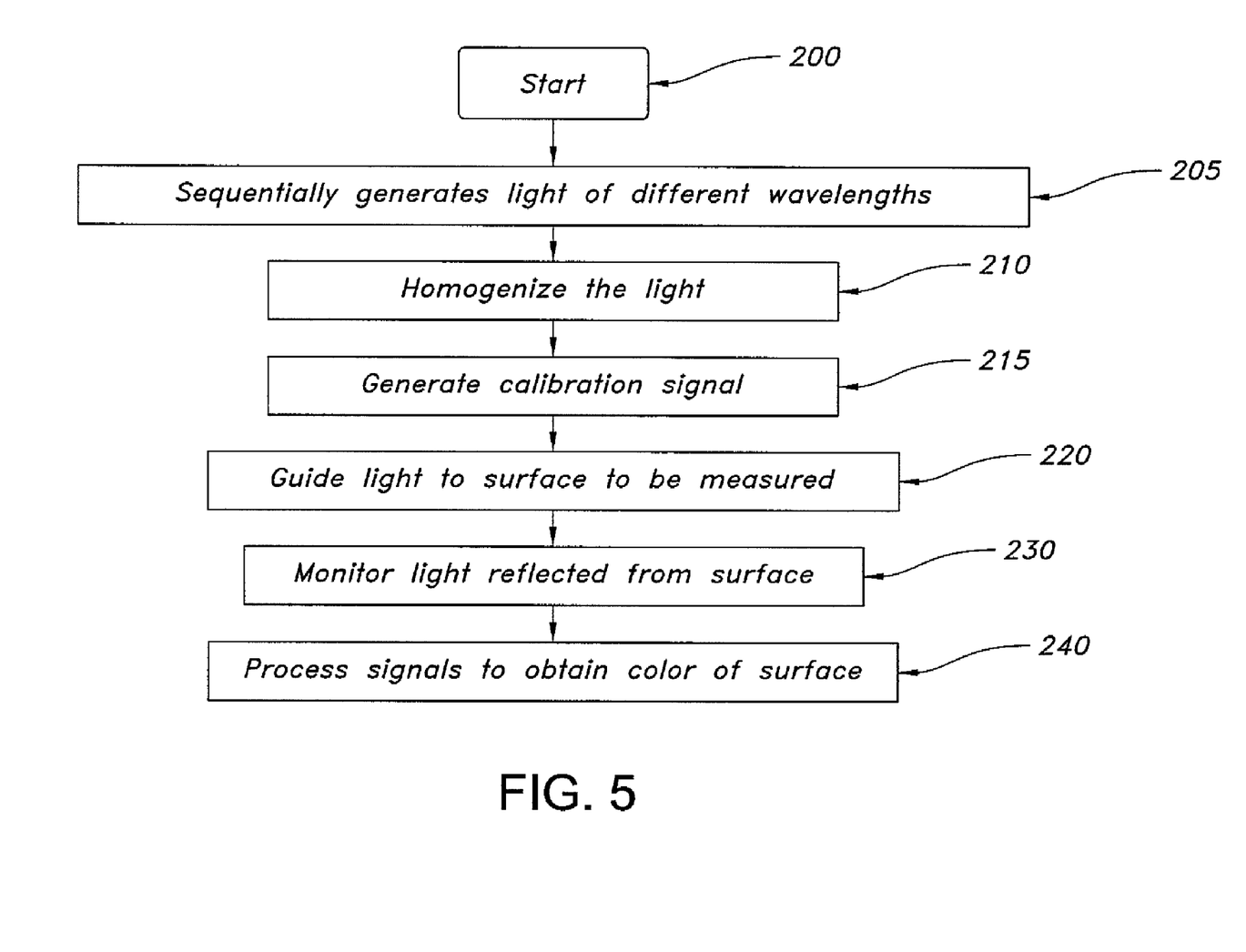
FIG. 5 illustrates a flowchart for practicing an exemplary method by which an exemplary color measuring instrument of the present disclosure operates according to various embodiments of the present disclosure.

FIG. 5 illustrates a method by which exemplary color measuring instruments of the present disclosure, e.g., color measuring instrument 5, may operate. After starting at step 200, the disclosed color measurement method may include step 205, sequentially generating light of different wavelengths. In step 210, the light may be randomized, and in step 215, a calibration signal may be generated. In step 220, the light may be guided to a surface that is to be observed, and in step 230, the light reflected from the surface may be monitored. In step 240, signals generated in step 215 and in step 230 may be processed to obtain color information for the surface.

It is to be understood that the figures and descriptions of the present disclosure have been simplified to illustrate elements that are relevant for a clear understanding of the apparatus, systems and methods of the present invention, while eliminating, for purposes of clarity, other elements, such as, for example, details of various physical models of LED's, etc. Those of ordinary skill in the art will recognize that these and other elements may be desirable. However, because such elements are well known in the art and because they do not facilitate a better understanding of the present invention, a discussion of such elements is not provided herein.

As used herein, a "processing unit," "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The disclosed processing unit 145 may operate according to software code to be executed by a processor or processors of the processing unit 145 or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. The present disclosure is therefore intended to cover all such modifications, alterations and adaptations without departing from the scope and spirit of the present invention as defined by the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A color measurement instrument for measuring a color of a surface, the color measurement instrument comprising:
a plurality of independently switchable light sources, the light sources characterized by differing spectral ranges;
a plurality of light guides configured to receive light from the light sources and to direct the received light to a light-emitting portion of the instrument, the light-emitting portion being configured to illuminate the surface;
a first light detector configured to receive a portion of the light that is reflected from the surface, wherein the first light detector is a wideband light detector;
an orientation reference for placing the instrument in a preferred orientation relative to the surface; and
a light mixer for receiving light from the light sources, randomizing the light, and passing the randomized light to the light guides.

2. The color measurement instrument according to claim 1, wherein at least one of the light sources comprises a light-emitting diode.

3. The color measurement instrument according to claim 1, wherein the light sources are mounted on a printed circuit board.

4. The color measurement instrument according to claim 1, wherein the light-emitting portion is configured to direct the light obliquely toward the surface when the instrument is disposed in the preferred orientation relative to the surface.

5. The color measurement instrument according to claim 1, wherein the light-emitting portion is configured to direct the light in a plurality of directions disposed about an optical axis of the light-emitting portion.

6. The color measurement instrument according to claim 5, wherein the light-emitting portion includes a reflective surface.

7. The color measurement instrument according to claim 1, wherein the light-emitting portion comprises a substantially axisymmetric tip, the substantially axisymmetric tip comprising an aperture defined by a rim substantially lying in a plane.

8. The color measurement instrument according to claim 7, wherein the substantially axisymmetric tip is configured to direct the light in a plurality of directions disposed about a normal to the plane.

9. The color measurement instrument according to claim 7, wherein the substantially axisymmetric tip substantially comprises a frustum of a cone.

10. The color measurement instrument according to claim 7, wherein the aperture has a diameter smaller than about one centimeter.

11. The color measurement instrument according to claim 7, wherein the substantially axisymmetric tip is detachable and is sterilizable or disposable.

12. The color measurement instrument according to claim 7, wherein the first light detector receives light reflected from the surface via the aperture.

13. The color measurement instrument according to claim 7, wherein the substantially axisymmetric tip excludes ambient light when the rim is in contact with the surface and is oriented in a plane substantially parallel to the surface.

14. The color measurement instrument according to claim 1, further comprising a second light detector for calibrating signals from the first light detector.

15. The color measurement instrument according to claim 1, further comprising a second light detector configured to receive randomized light from the light mixer.

16. The color measurement instrument according to claim 1, further comprising a processor connected to receive signals from the first light detector.

17. The color measurement instrument according to claim 16, further comprising a display connected to the processor, the display indicating color information for the surface.

18. The color measurement instrument according to claim 1, wherein the instrument is configured to be held in one hand.

19. The color measurement instrument according to claim 1, wherein the instrument is configured to obtain color information from an area of the surface characterized by a diameter of about 3 millimeters.

20. A color measurement instrument for measuring a color of a tooth, the color measurement instrument comprising:
a plurality of independently switchable light sources, the light sources characterized by differing spectral ranges;
a plurality of light guides configured to receive light from the light sources and to direct the received light to a light-emitting portion of the instrument, the light-emitting portion being configured to illuminate a surface of the tooth;
a first light detector configured to receive a portion of the light that is reflected from the surface, wherein the first light detector is a wideband light detector,
an orientation reference for placing the instrument in a preferred orientation relative to the surface; and
a light mixer for receiving light from the light sources, randomizing the light, and passing the randomized light to the light guides.

21. The color measurement instrument according to claim 20, wherein the light-emitting portion comprises a substantially axisymmetric tip, the substantially axisymmetric tip comprising an aperture defined by a rim substantially lying in a plane.

22. The color measurement instrument according to claim 21, wherein the substantially axisymmetric tip is configured to direct the light in a plurality of directions disposed about a normal to the plane.

23. The color measurement instrument according to claim 21, wherein the substantially axisymmetric tip substantially comprises a frustum of a cone.

24. A method for measuring a color of a surface, the method comprising:
using an orientation reference to place a color measurement instrument in a preferred orientation relative to the surface;
sequentially generating light characterized by differing spectral ranges in a plurality of light sources;
using a light mixer to receive light from the light sources, randomizing the light, and pass the randomized light to a plurality of the light guides;
guiding the light onto the surface via the plurality of light guides;
monitoring light reflected from the surface by a first light detector, wherein the first light detector is a wideband light detector; and
processing signals from the first light detector to provide color information for the surface.

25. The method according to claim 24, further comprising receiving a portion of the light from the light mixer into a second light detector and generating a calibration signal for use in the step of processing the signals from the first light detector.

26. The method according to claim 24, further comprising presenting the color information on a display.

27. The method according to claim 24, further comprising storing the color information in memory.

* * * * *